(12) United States Patent
Anspaugh et al.

(10) Patent No.: US 11,661,097 B1
(45) Date of Patent: May 30, 2023

(54) ENERGY ABSORPTION STRAP ASSEMBLY WITH BREAKAWAY LOAD TUNING FEATURE

(71) Applicant: Steering Solutions IP Holding Corporation, Saginaw, MI (US)

(72) Inventors: Michael P. Anspaugh, Bay City, MI (US); Randy W. Jones, North Branch, MI (US); Chet A. Hickmott, Bay City, MI (US); Kurt D. Dubay, Merrill, MI (US); Anthony R. Talhelm, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/690,303

(22) Filed: Mar. 9, 2022

(51) Int. Cl.
*B62D 1/19* (2006.01)
*B62D 1/185* (2006.01)

(52) U.S. Cl.
CPC .............. *B62D 1/192* (2013.01); *B62D 1/185* (2013.01)

(58) Field of Classification Search
CPC ................................ B62D 1/192; B62D 1/185
See application file for complete search history.

(56) References Cited

U.S. PATENT DOCUMENTS

| | | | | |
|---|---|---|---|---|
| 7,455,320 | B2 * | 11/2008 | Imamura ................ | B62D 1/195 280/777 |
| 2012/0024101 | A1 * | 2/2012 | Schnitzer ............... | B62D 1/195 74/492 |
| 2016/0244015 | A1 * | 8/2016 | Dubay .................... | B60R 21/02 |
| 2021/0316779 | A1 * | 10/2021 | Dubay .................... | B62D 1/184 |
| 2022/0126907 | A1 | 4/2022 | Dubay et al. | |

FOREIGN PATENT DOCUMENTS

CN 109789890 A * 5/2019 ............. B62D 1/184

* cited by examiner

*Primary Examiner* — Drew J Brown
(74) *Attorney, Agent, or Firm* — Dickinson Wright PLLC

(57) ABSTRACT

A steering column assembly includes a lower jacket. The steering column assembly also includes an upper jacket in telescoping engagement with the lower jacket. The steering column assembly further includes an energy absorbing strap assembly operatively coupled to the upper jacket. The energy absorbing strap assembly includes a strap having a stationary leg and a moveable leg, the moveable leg extending from a first strap end region to a curved portion, the stationary leg extending from the curved portion to a second strap end region, wherein the second strap end region forms a U-shape defined by a radially outer segment, a radially inner segment and a connecting segment to join the radially outer segment and the radially inner segment. The energy absorbing strap assembly also includes a pin extending through the radially inner segment of the stationary leg and the moveable leg.

20 Claims, 5 Drawing Sheets

ENERGY ABSORPTION STRAP ASSEMBLY WITH BREAKAWAY LOAD TUNING FEATURE

FIELD OF THE INVENTION

The embodiments described herein relate to vehicle steering systems and, more particularly, to an energy absorption strap assembly with a breakaway load tuning feature.

BACKGROUND

A steering column assembly of a vehicle may include one or more energy absorption features. For example, an energy absorption strap (EA strap) assembly may be operatively coupled to an upper jacket and configured to unroll once a specified collapse load is exceeded. On adjustable steering columns, energy absorbing straps are utilized to absorb an occupant's mass during a collapse event of the steering column.

A breakaway pin may be pressed into the EA strap to satisfy a low initial breakaway load requirement for the energy absorbing system on steering columns. However, a pin that is pressed through one portion of the EA strap may not achieve a targeted load profile in some applications. Additionally, specifications provided by a customer (e.g., OEM) to a manufacturer often request the ability to tune the breakaway load level and/or profile duration. For example, customers commonly estimate a range of a breakaway load to start a project, but then later refine their requests throughout project implementation. A desirable design would be flexible to meet a wide range of load levels and profiles, along with short lead times and reasonable cost associated with adjustment of the load levels and profiles.

SUMMARY

According to one aspect of the disclosure, a steering column assembly includes a lower jacket. The steering column assembly also includes an upper jacket in telescoping engagement with the lower jacket. The steering column assembly further includes an energy absorbing strap assembly operatively coupled to the upper jacket. The energy absorbing strap assembly includes a strap having a stationary leg and a moveable leg, the moveable leg extending from a first strap end region to a curved portion, the stationary leg extending from the curved portion to a second strap end region, wherein the second strap end region forms a U-shape defined by a radially outer segment, a radially inner segment and a connecting segment to join the radially outer segment and the radially inner segment. The energy absorbing strap assembly also includes a pin extending through the radially inner segment of the stationary leg and the moveable leg.

According to another aspect of the disclosure, an energy absorbing strap assembly for a vehicle steering column is provided. The energy absorbing strap assembly includes a strap having a stationary leg and a moveable leg, the moveable leg extending from a first strap end region to a curved portion, the stationary leg extending from the curved portion to a second strap end region, wherein the second strap end region includes a pair of overlapping segments. The energy absorbing strap assembly also includes a pin extending through the moveable leg and one of the pair of overlapping segments.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosure. Although one or more of these embodiments may be discussed or illustrated in greater detail, the embodiments disclosed should not be interpreted as limiting the scope of the disclosure, including the claims. In addition, one skilled in the art will understand that the following description has broad application, and the discussion of any embodiment is meant only to be exemplary of that embodiment, and not intended to intimate that the scope of the disclosure is limited to that embodiment.

Figure 1:
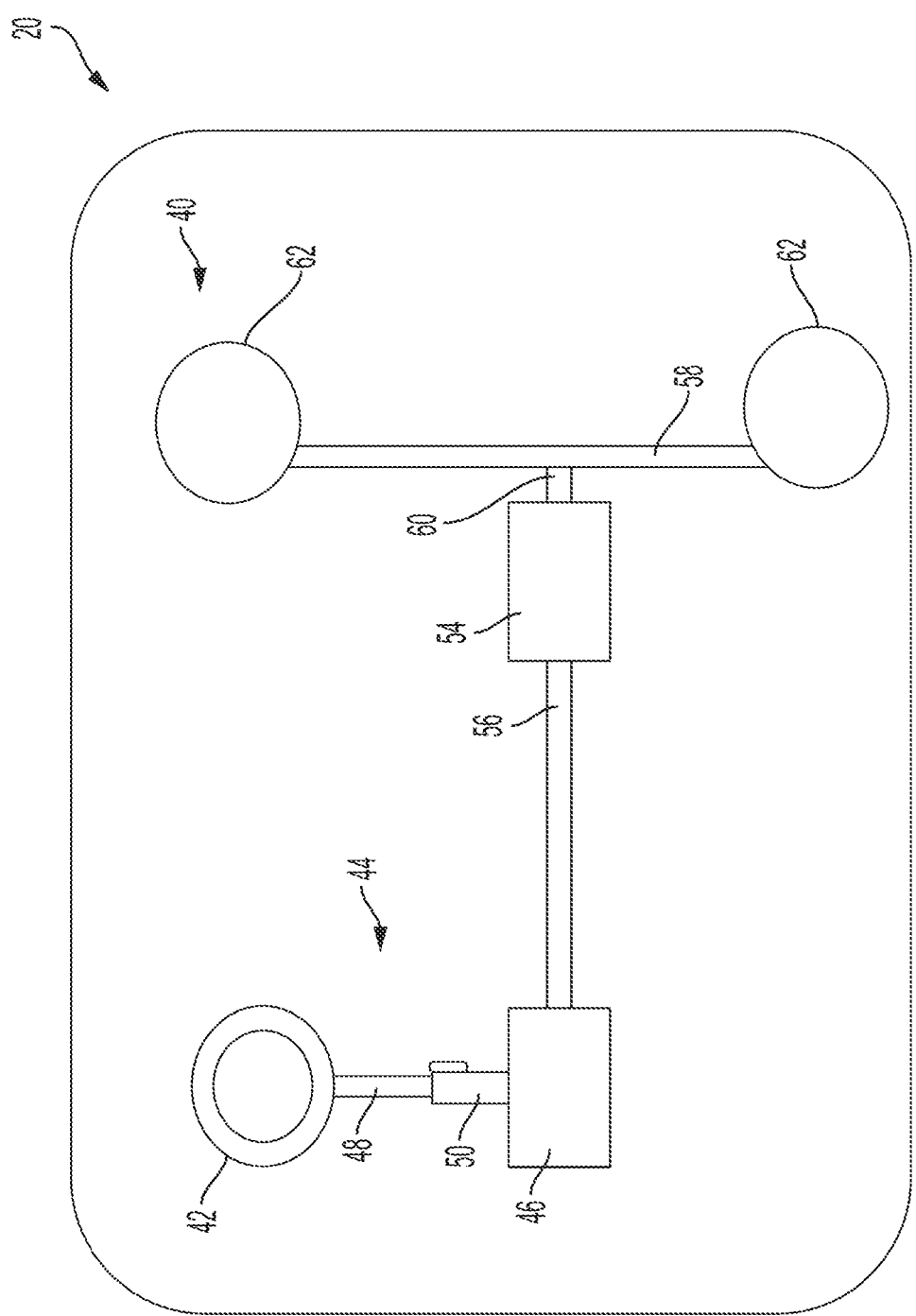
FIG. 1 is a schematic illustration of a vehicle steering system.

Referring initially to FIG. 1, a steering system 40 for a vehicle 20 is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as planes, boats, trains, drones, or other suitable vehicles.

The steering system 40 may be configured as a driver interface steering system, an autonomous driving system, or a system that allows for both driver interface and autonomous steering. The steering system 40 may include an input device 42, such as a steering wheel, wherein a driver may mechanically provide a steering input by turning the steering wheel. An airbag device may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 (also referred to as an upper jacket 48) and a second jacket 50 (also referred to as a lower jacket 50) that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a mounting bracket that at least partially connects the steering column to the vehicle 20. The steering column assembly 44 may also be adjustable in a rake direction.

A steering gear assembly 54 may connect to the output assembly 46 via a steering gear input shaft 56 in embodiments where a mechanical connection is present, but it is to be appreciated that an output assembly 46 and/or input shaft 56 may not be present in some steering systems, such as a steer-by-wire system, for example. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axel to turn the wheels 62.

Figure 2:
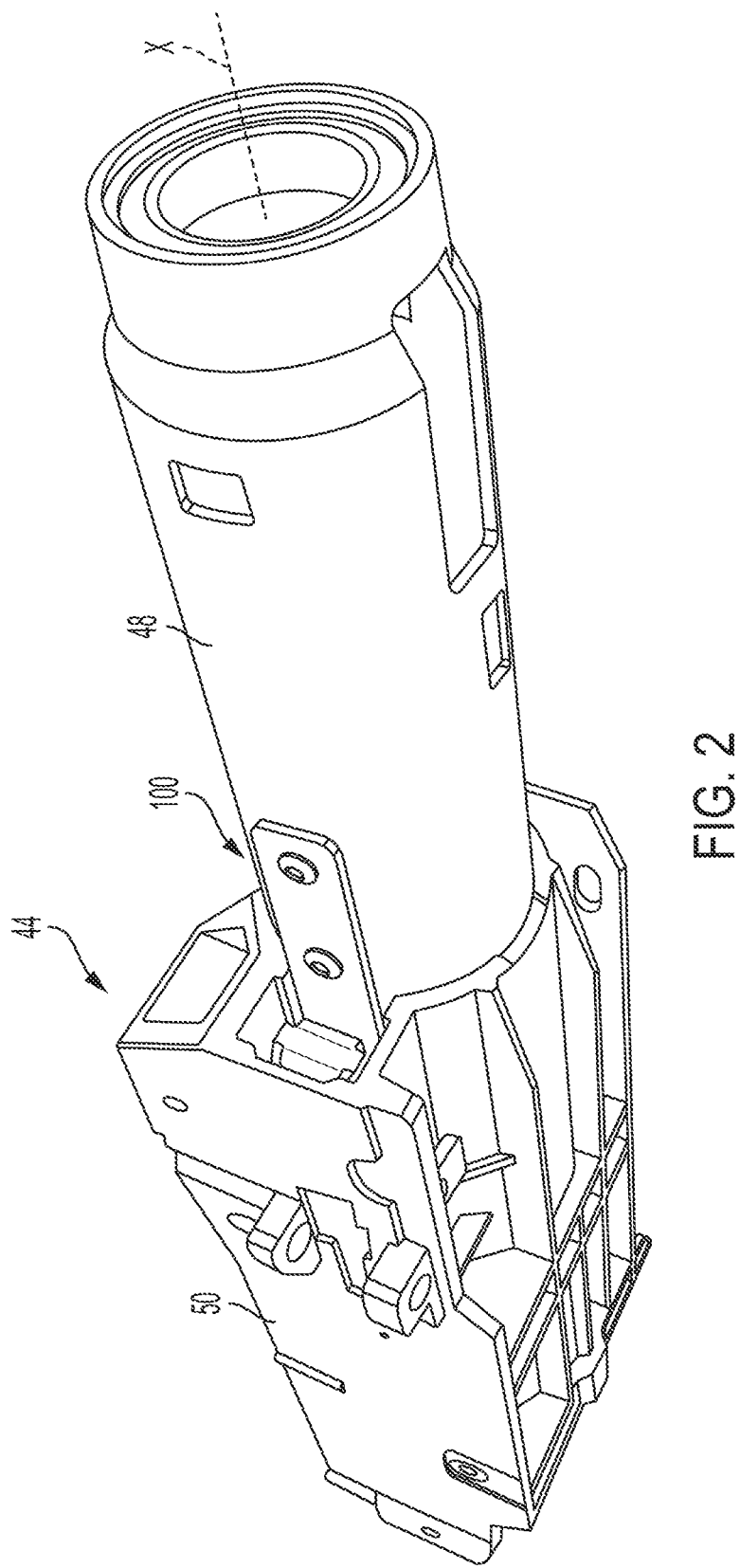
FIG. 2 is perspective view of a steering column showing a portion of an energy absorption strap.

Referring now to FIG. 2, the upper jacket 48 is movable, relative to the lower jacket 50, during a normal operating condition of the vehicle 20 to telescopically adjust a position of the steering wheel along a longitudinal axis "X", as described above. The normal operating condition (also referred to herein as a first condition of the steering column) is defined as a normal driving condition that allows adjustment of the upper jacket 48 over a predefined range of telescoping movement that is suitable for driving.

The steering column assembly 44 is also operable in a second operating condition defined as a collapse of the upper jacket 48 during an energy absorbing event. In this condition, energy-absorbing movement (i.e., energy absorbing collapsibility) of the upper jacket 48 along the longitudinal axis "X" within the lower jacket 50 is provided. To assist with the energy absorbing process during a collapse event, and to reduce the number of components and assembly complexity, an energy absorbing strap assembly is disclosed herein. The energy absorbing strap assembly is generally referenced with numeral 100. The energy absorption strap assembly (EA strap assembly) 100 is operatively coupled to the upper jacket 48 to assist with the energy absorbing process during a collapse event.

Figure 3:
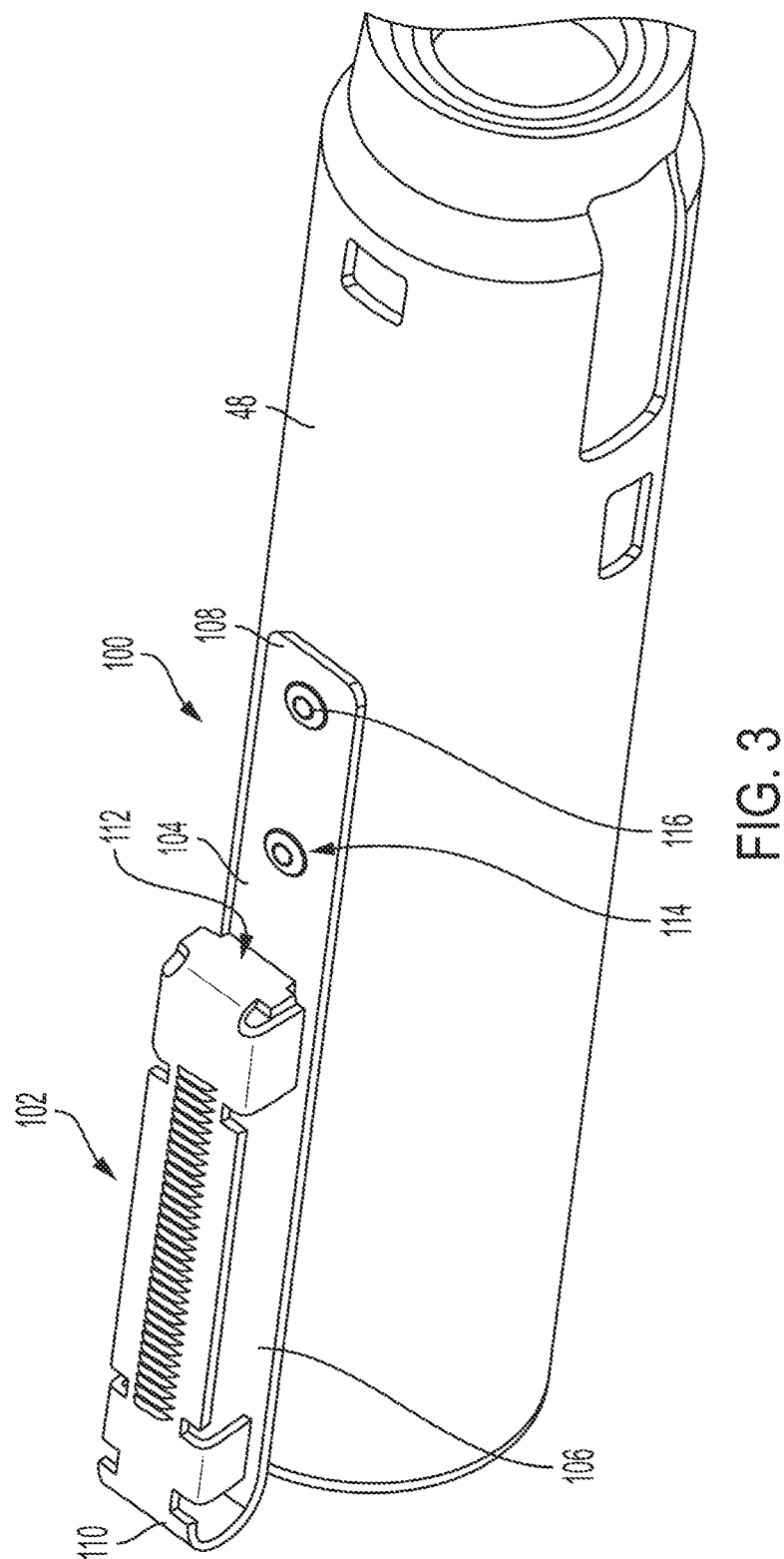
FIG. 3 is a perspective view of the energy absorption strap coupled to a jacket of the steering column.
Figure 4:
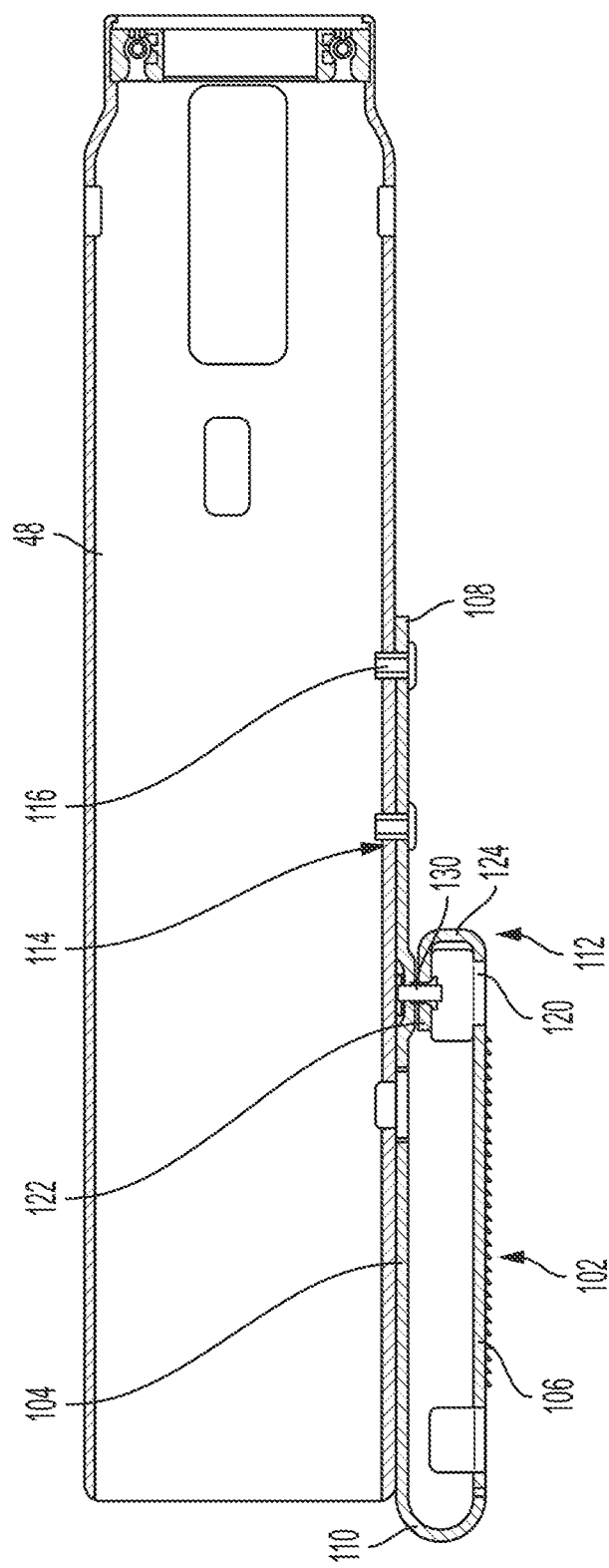
FIG. 4 is a side, elevational view of the energy absorption strap coupled to the jacket of the steering column.

Referring now to FIGS. 3 and 4, the EA strap assembly 100 includes an energy absorbing strap 102 having a first leg 104 and a second leg 106 which are spaced from each other. The first leg 104 extends from a first strap end region 108 to a curved segment 110. The second leg 106 extends from the curved segment 110 to a second strap end region 112. The curved segment 110 forms a substantially U-shaped energy absorbing strap 102. The first leg 104 extends further from the curved segment 110, relative to the distance that the second leg 106 extends from the curved segment 110. In other words, the first leg 104 is axially longer (using longitudinal axis X as a reference) than the second leg 106.

The first leg 104 defines a pair of apertures 114. The energy absorbing strap 102 is directly coupled to the upper jacket 48 with one or more mechanical fasteners 116 that extend through the apertures 114 of the first leg 104. Although illustrated in a specific position, it is to be appreciated that the precise location of the apertures 114 and mechanical fastener(s) 116 may vary depending upon the particular application and on various design factors. The illustrated embodiment shows a pair of apertures 114 that the mechanical fasteners 116 couple with, however more or fewer mechanical fasteners 116 and apertures 114 is within the scope of the disclosure.

Figure 5:
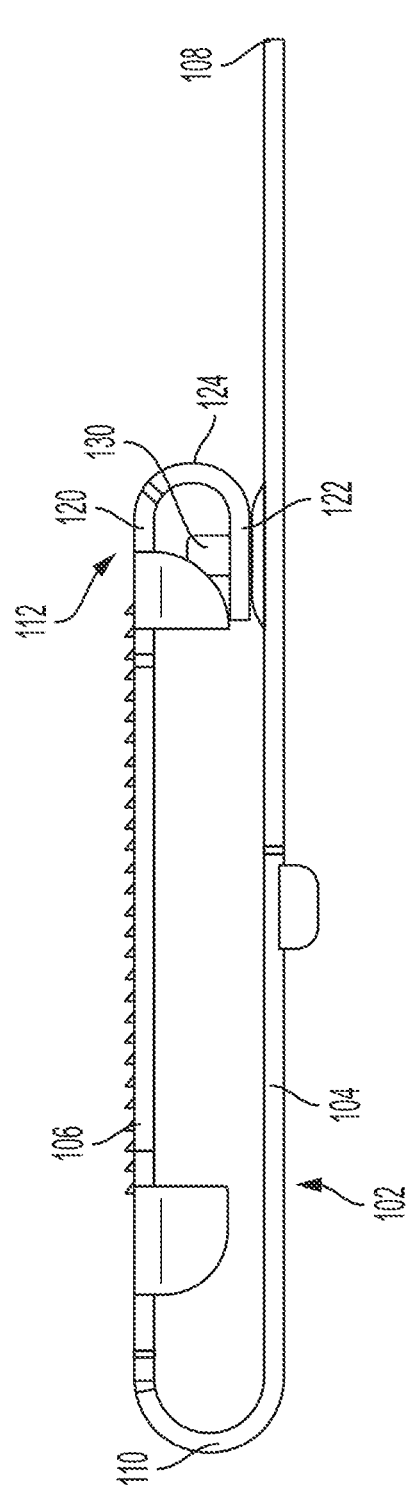
FIG. 5 is a side, elevational view of the energy absorption strap.
Figure 6:
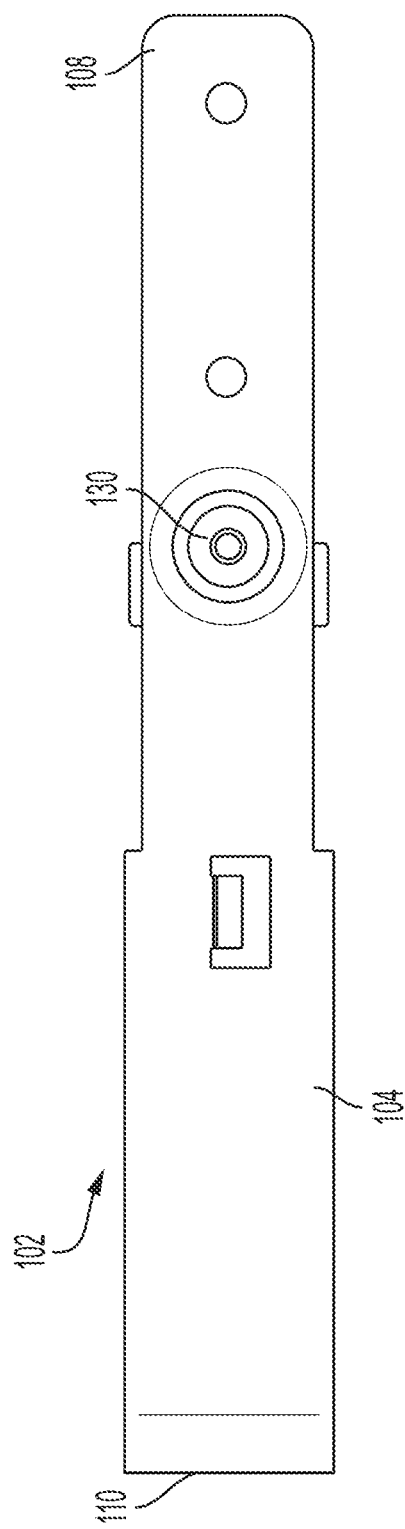
FIG. 6 is a plan view of the energy absorption strap.

Referring now to FIGS. 4-6, the second strap end region 112 is shown in more detail. The second strap end region 112 is the portion of the second leg 106 most distal from the curved segment 110. The second strap end region 112 includes a radially outer segment 120 (relative to longitudinal axis X), a radially inner segment 122, and a connecting segment 124 that joins the radially outer segment 120 and the radially inner segment 122. In the illustrated embodiment, the second leg 106 extends in a substantially planar manner to include the radially outer segment 120. The connecting segment 124 extends from the radially outer segment 120 at about a right angle therefrom, as shown in FIG. 4. However, slight angular deviations, including curvature, may be desirable in some embodiments, such as the embodiment shown in FIG. 5. The radially inner segment 122 extends away from the connecting segment 124 at about a right angle—as shown in FIG. 4—toward the curved segment 110 to complete a substantially U-shaped second strap end region 112 of the strap 102. As with the connecting segment 124, the angle at which the radially inner segment 122 extends from the connecting segment 124 may deviate from the above-noted right angle, including curvature, in some embodiments, such as the embodiment shown in FIG. 5.

Based on the substantially U-shaped second strap end region 112, the radially inner segment 122 axially overlaps with a portion of the first leg 104 and the radially outer segment 120. Therefore, the radially outer segment 120 and the radially inner segment 122 form a pair of overlapping segments. As shown, a pin 130 is provided to resist unrolling of the energy absorbing strap 102 up to a predetermined breakaway load. Rather than passing through one portion of the energy absorbing strap 102 and into the upper jacket 48, the pin 130 extends through both legs 104, 106 of the energy absorbing strap 102. In particular, the pin 130 extends through the first leg 104 and the radially inner segment 122 of the second leg 106 to resist unrolling of the energy absorbing strap 102.

The pin 130 may be formed of a metal in some embodiments or other materials, such as plastic, for example. The material choice is a parameter that facilitates customization of the breakaway load and the breakaway load profile of the energy absorbing strap assembly 100. In particular, the material of the pin provide different fracture resistances. The pin 30 may be a rivet in some embodiments.

The energy absorbing strap 102 includes a stationary portion (which corresponds to the second leg 106) and a moveable portion (which corresponds to the first leg 104) that rolls during an energy absorption event. As shown, the pin 130 extends through the stationary portion (i.e., radially inner segment 122) and the moveable portion (i.e., first leg 104). In particular, the radially inner segment 122 includes a first hole and the first leg 104 includes a second hole. The first hole and the second hole are aligned with each other to allow insertion of the pin 130 through each hole.

The pin 130 provides an initial breakaway load that supplements the initial load of the energy absorbing strap 102. The pin 130 provides a substantially higher initial breakaway load by being inserted through the stationary and moveable portions of the energy absorbing strap 102, and not the upper jacket 48. Several parameters of the energy absorbing strap assembly 100 may be adjusted to easily and rapidly customize the EA strap assembly's initial breakaway load and the breakaway load profile—which is defined by the breakaway duration and dynamics. As described above, the size and material of the pin 130 may be adjusted to tune the breakaway load and breakaway load profile. Additionally, as shown in FIGS. 3-5, the connecting segment 124 and the radially inner segment 122 each have a respective axial length and width, as well as a geometric shape. These parameters may be adjusted, independently or in combination, to customize the breakaway load and/or the breakaway load profile of the energy absorbing strap 102.

Advantageously, the embodiments disclosed herein provide improved control of the breakaway load level, improved control of the breakaway load profile duration, makes it simple to refine the breakaway load level and profile, facilitates dimensional control of the EA strap end separation, and allows a higher initial load prior to EA strap un-rolling. Additionally, the EA strap assembly 100 improves the stability of the EA strap 102, thus making it more robust against telescope impact loading, and secures the EA strap for better dimensional control after assembly.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a lower jacket;
   an upper jacket in telescoping engagement with the lower jacket; and
   an energy absorbing strap assembly operatively coupled to the upper jacket, the energy absorbing strap assembly comprising:
     a strap having a stationary leg and a moveable leg, the moveable leg extending from a first strap end region to a curved portion, the stationary leg extending from the curved portion to a second strap end region, wherein the second strap end region forms a U-shape defined by a radially outer segment, a radially inner segment and a connecting segment to join the radially outer segment and the radially inner segment; and
     a pin extending through the radially inner segment of the stationary leg and the moveable leg.

2. The steering column assembly of claim 1, wherein the pin is formed of metal.

3. The steering column assembly of claim 2, wherein the pin is a rivet.

4. The steering column assembly of claim 1, wherein the pin is formed of plastic.

5. The steering column assembly of claim 1, wherein the pin does not extend into the upper jacket.

6. The steering column assembly of claim 1, wherein the moveable leg defines at least one aperture for receiving a mechanical fastener that directly couples the moveable leg to the upper jacket.

7. The steering column assembly of claim 1, wherein the moveable leg is longer than the stationary leg.

8. The steering column assembly of claim 1, wherein a breakaway load of the strap is customizable based on at least one parameter comprising a length of the connecting segment, a width of the connecting segment, and a geometric shape of the connecting segment.

9. The steering column assembly of claim 1, wherein a breakaway load of the strap is customizable based on at least one parameter comprising a length of the radially inner segment, a width of the radially inner segment, and a geometric shape of the radially inner segment.

10. The steering column assembly of claim 1, wherein a breakaway load profile of the strap is customizable based on at least one parameter comprising a length of the connecting segment, a width of the connecting segment, and a geometric shape of the connecting segment.

11. The steering column assembly of claim 1, wherein a breakaway load profile of the strap is customizable based on at least one parameter comprising a length of the radially inner segment, a width of the radially inner segment, and a geometric shape of the radially inner segment.

12. An energy absorbing strap assembly for a vehicle steering column, the energy absorbing strap assembly comprising:
   a strap having a stationary leg and a moveable leg, the moveable leg extending from a first strap end region to a curved portion, the stationary leg extending from the curved portion to a second strap end region, wherein the second strap end region includes a pair of overlapping segments; and
   a pin extending through the moveable leg and one of the pair of overlapping segments.

13. The energy absorbing strap assembly of claim 12, wherein the pin is formed of metal.

14. The energy absorbing strap assembly of claim 12, wherein the pin is formed of plastic.

15. The energy absorbing strap assembly of claim 12, wherein the pair of overlapping segments is a radially outer segment and a radially inner segment, wherein the second strap end region further comprises a connecting segment to join the radially outer segment and the radially inner segment.

16. The energy absorbing strap assembly of claim 15, wherein the pin extends through the moveable leg and the radially inner segment.

17. The energy absorbing strap assembly of claim 15, wherein a breakaway load of the strap is customizable based on at least one parameter comprising a length of the connecting segment, a width of the connecting segment, and a geometric shape of the connecting segment.

18. The energy absorbing strap assembly of claim 15, wherein a breakaway load of the strap is customizable based on at least one parameter comprising a length of the radially inner segment, a width of the radially inner segment, and a geometric shape of the radially inner segment.

19. The energy absorbing strap assembly of claim 15, wherein a breakaway load profile of the strap is customizable based on at least one parameter comprising a length of the connecting segment, a width of the connecting segment, and a geometric shape of the connecting segment.

20. The energy absorbing strap assembly of claim 15, wherein a breakaway load profile of the strap is customizable based on at least one parameter comprising a length of the radially inner segment, a width of the radially inner segment, and a geometric shape of the radially inner segment.

* * * * *